United States Patent
Minas et al.

(10) Patent No.: US 12,507,984 B2
(45) Date of Patent: Dec. 30, 2025

(54) STRAIN RELIEF FOR INTRALUMINAL ULTRASOUND IMAGING AND ASSOCIATED DEVICES, SYSTEMS, AND METHODS

(71) Applicant: PHILIPS IMAGE GUIDED THERAPY CORPORATION, San Diego, CA (US)

(72) Inventors: Maritess Minas, San Diego, CA (US); Jeremy Stigall, Carlsbad, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 435 days.

(21) Appl. No.: 17/420,958

(22) PCT Filed: Jan. 7, 2020

(86) PCT No.: PCT/EP2020/050174
§ 371 (c)(1),
(2) Date: Jul. 6, 2021

(87) PCT Pub. No.: WO2020/144159
PCT Pub. Date: Jul. 16, 2020

(65) Prior Publication Data
US 2022/0087640 A1    Mar. 24, 2022

Related U.S. Application Data

(60) Provisional application No. 62/789,184, filed on Jan. 7, 2019.

(51) Int. Cl.
*A61B 8/12* (2006.01)
*A61B 8/00* (2006.01)
*A61M 25/00* (2006.01)

(52) U.S. Cl.
CPC ............... *A61B 8/12* (2013.01); *A61B 8/445* (2013.01); *A61B 8/4494* (2013.01);
(Continued)

(58) Field of Classification Search
CPC ......... A61B 8/12; A61B 8/445; A61B 8/4494; A61B 8/4488; A61M 25/0014; A61M 2025/0098
See application file for complete search history.

(56) References Cited

U.S. PATENT DOCUMENTS 5,368,037 A   11/1994   Eberle
6,776,763 B2   8/2004   Nix
(Continued)

FOREIGN PATENT DOCUMENTS

WO   2017143457 A1   8/2017
WO   2017168300 A1   10/2017
WO   2018077706 A1   5/2018

OTHER PUBLICATIONS

International Search Report and Written Opinion of PCT/EP2020/050174, dated May 6, 2020.

*Primary Examiner* — Serkan Akar

(57) ABSTRACT

Intraluminal imaging devices and methods of assembling the intraluminal imaging devices are provided. For example, an intraluminal imaging device can include a flexible elongate catheter body and a rigid imaging assembly coupled to a distal portion of the elongate catheter body. A distal portion of the inner member is positioned within a lumen of the imaging assembly, and the flexible elongate member comprises a strain relief layer positioned around the inner member. A distal portion of the strain relief layer is positioned radially between the inner member and the imaging assembly, and a proximal end of the strain relief layer is positioned distally of a proximal end of the inner member, forming a transition region. The transition region can pre-
(Continued)

vent bending or kinking of the flexible elongate catheter body when the intraluminal imaging device is navigating tortuous regions of the patient's anatomy.

19 Claims, 11 Drawing Sheets

(52) U.S. Cl.
CPC ....... *A61M 25/0014* (2013.01); *A61B 8/4488* (2013.01); *A61M 2025/0098* (2013.01)

(56) References Cited

U.S. PATENT DOCUMENTS

| | | |
|---|---|---|
| 7,226,417 B1 | 6/2007 | Eberle |
| 7,846,101 B2 | 12/2010 | Eberle |
| 8,852,112 B2 * | 10/2014 | Bielewicz ................ A61B 8/12 600/463 |
| 2008/0065002 A1 | 3/2008 | Lobl |
| 2010/0241008 A1 | 9/2010 | Belleville |
| 2012/0123352 A1 * | 5/2012 | Fruland ................ A61B 8/4281 604/264 |
| 2014/0163421 A1 | 6/2014 | Van Hoven |
| 2014/0171736 A1 | 6/2014 | Stigall |
| 2014/0276028 A1 | 9/2014 | Stigall |
| 2015/0080700 A1 | 3/2015 | Fruland |
| 2015/0305710 A1 | 10/2015 | Stigall |
| 2020/0008780 A1 * | 1/2020 | Sudol ................ A61B 8/4494 |

\* cited by examiner

STRAIN RELIEF FOR INTRALUMINAL ULTRASOUND IMAGING AND ASSOCIATED DEVICES, SYSTEMS, AND METHODS

TECHNICAL FIELD

The present disclosure relates generally to intraluminal medical imaging and, in particular, to the distal structure of an intraluminal imaging device. For example, the distal structure can include a strain relief layer that is positioned over an elongate member and partially within a lumen of an imaging assembly to facilitate robust operation of the intravascular imaging device.

BACKGROUND

Intravascular ultrasound (IVUS) imaging is widely used in interventional cardiology as a diagnostic tool for assessing a diseased vessel, such as an artery, within the human body to determine the need for treatment, to guide the intervention, and/or to assess its effectiveness. An IVUS device including one or more ultrasound transducers is passed into the vessel and guided to the area to be imaged. The transducers emit ultrasonic energy in order to create an image of the vessel of interest. Ultrasonic waves are partially reflected by discontinuities arising from tissue structures (such as the various layers of the vessel wall), red blood cells, and other features of interest. Echoes from the reflected waves are received by the transducer and passed along to an IVUS imaging system. The imaging system processes the received ultrasound echoes to produce a cross-sectional image of the vessel where the device is placed.

Solid-state (also known as synthetic-aperture) IVUS catheters are one of the two types of IVUS devices commonly used today, the other type being the rotational IVUS catheter. Solid-state IVUS catheters carry a scanner assembly that includes an array of ultrasound transducers distributed around its circumference along with one or more integrated circuit controller chips mounted adjacent to the transducer array. The controllers select individual acoustic elements (or groups of elements) for transmitting an ultrasound pulse and for receiving the ultrasound echo signal. By stepping through a sequence of transmit-receive pairs, the solid-state IVUS system can synthesize the effect of a mechanically scanned ultrasound transducer but without moving parts (hence the solid-state designation). The solid-state scanner can be wired directly to the imaging system with a simple electrical cable and a standard detachable electrical connector, rather than the complex rotating electrical interface required for a rotational IVUS device.

Manufacturing solid-state IVUS devices that can efficiently traverse anatomic structures within the human body is challenging. In that regard, IVUS devices can include various structures having different mechanical properties (e.g., stiffness) at different portions along the length of the devices, such as the relatively stiff scanner assembly and the relatively flexible elongate catheter body. These differences in mechanical properties can lead to bending or kinking, particularly when the IVUS devices are traversing tortuous regions of the vasculature.

SUMMARY

Embodiments of the present disclosure provide improved intraluminal imaging devices, as well as methods of assembling the improved intraluminal imaging devices. For example, in one embodiment, an intraluminal imaging device includes a flexible elongate catheter body and a rigid imaging assembly coupled to a distal portion of the elongate catheter body. A distal end of the elongate catheter body is positioned within a lumen of the imaging assembly. A strain relief layer is positioned around the distal end of the elongate catheter body that is inserted within the lumen of the imaging assembly such that a distal portion of the strain relief layer is radially between the elongate catheter body and the imaging assembly. A proximal portion of the strain relief layer extends proximally of the imaging assembly over the elongate catheter body to provide a transition region from the stiff imaging assembly to the flexible elongate catheter body. The transition region proximal of the imaging assembly can prevent bending or kinking of the flexible elongate catheter body when the intraluminal imaging device is navigating tortuous regions of the patient's anatomy.

In one embodiment of the present disclosure, an intraluminal ultrasound imaging includes a flexible elongate member configured to be positioned within a body lumen of a patient, the flexible elongate member comprising an inner member, and an imaging assembly comprising an ultrasound scanner circuit positioned around a lumen, the imaging assembly coupled to the flexible elongate member. A distal portion of the inner member is positioned within the lumen of the imaging assembly, and the flexible elongate member comprises a strain relief layer positioned around the inner member. A distal portion of the strain relief layer is positioned radially between the inner member and the imaging assembly, and a proximal end of the strain relief layer is positioned distally of a proximal end of the inner member.

In some embodiments, the strain relief layer comprises a heat shrink material. The heat shrink material can include a polyether block amide tube. In some embodiments, the flexible elongate member comprises an outer member positioned over a proximal portion of the inner member and a proximal portion of the strain relief layer. In some embodiments, the imaging assembly comprises a support member defining the lumen of the imaging assembly, and the ultrasound scanner circuit comprises a flexible substrate positioned around the support member. The ultrasound scanner circuit can include a conductor interface portion positioned around the strain relief layer. In some embodiments, the strain relief layer comprises a length of between 5 mm and 15 mm. The strain relief layer can include a wall thickness of between 0.025 mm and 0.032 mm, in some embodiments. In some embodiments, the strain relief layer is thermally bonded to inner member. In some embodiments, the strain relief layer is bonded to the inner member using an adhesive. In some embodiments, the imaging assembly is an intravascular ultrasound (IVUS) assembly, and the flexible elongate member comprises a catheter.

According to another embodiment of the present disclosure, a method for assembling an intraluminal ultrasound imaging device includes: forming a flexible elongate member configured to be positioned within a body lumen of a patient, wherein forming the flexible elongate member comprises positioning a strain relief tube around an inner member such that a proximal end of the strain relief tube is positioned distally of a proximal end of the inner member, and fixedly coupling the strain relief tube to the inner member. The method further comprises coupling an ultrasound imaging assembly to the flexible elongate member. Coupling the ultrasound imaging assembly comprises positioning a distal portion of the inner member and a distal portion of the strain relief tube through a lumen of the ultrasound imaging assembly.

In some embodiments, the method further includes positioning an outer member over a proximal portion of the inner member and a proximal portion of the strain relief tube. In some embodiments, fixedly coupling the strain relief tube comprises thermally bonding the strain relief tube and the inner member. In some embodiments, fixedly coupling the strain relief tube comprises applying heat to the strain relief tube to shrink the strain relief tube around the inner member. In some embodiments, fixedly coupling the strain relief tube comprises positioning a heat shrink tube around the strain relief tube and applying heat to the heat shrink tube to shrink the heat shrink tube around the strain relief tube. In some embodiments, the ultrasound imaging assembly comprises a scanner circuit positioned around a support member defining the lumen of the ultrasound imaging assembly, and positioning the distal portion of the inner member and the distal portion of the strain relief tube through the lumen of the imaging assembly comprises positioning the distal portion of the inner member and the distal portion of the strain relief tube through a lumen of the support member.

In some embodiments, the method further includes positioning an outer member over a proximal portion of the inner member and a proximal portion of the strain relief tube, and
positioning a conductor interface portion of the scanner circuit around an outer surface of the strain relief tube, wherein positioning the outer member of the proximal portion of the inner member and the proximal portion of the strain relief tube comprises positioning the outer member over the conductor interface portion of the scanner circuit.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
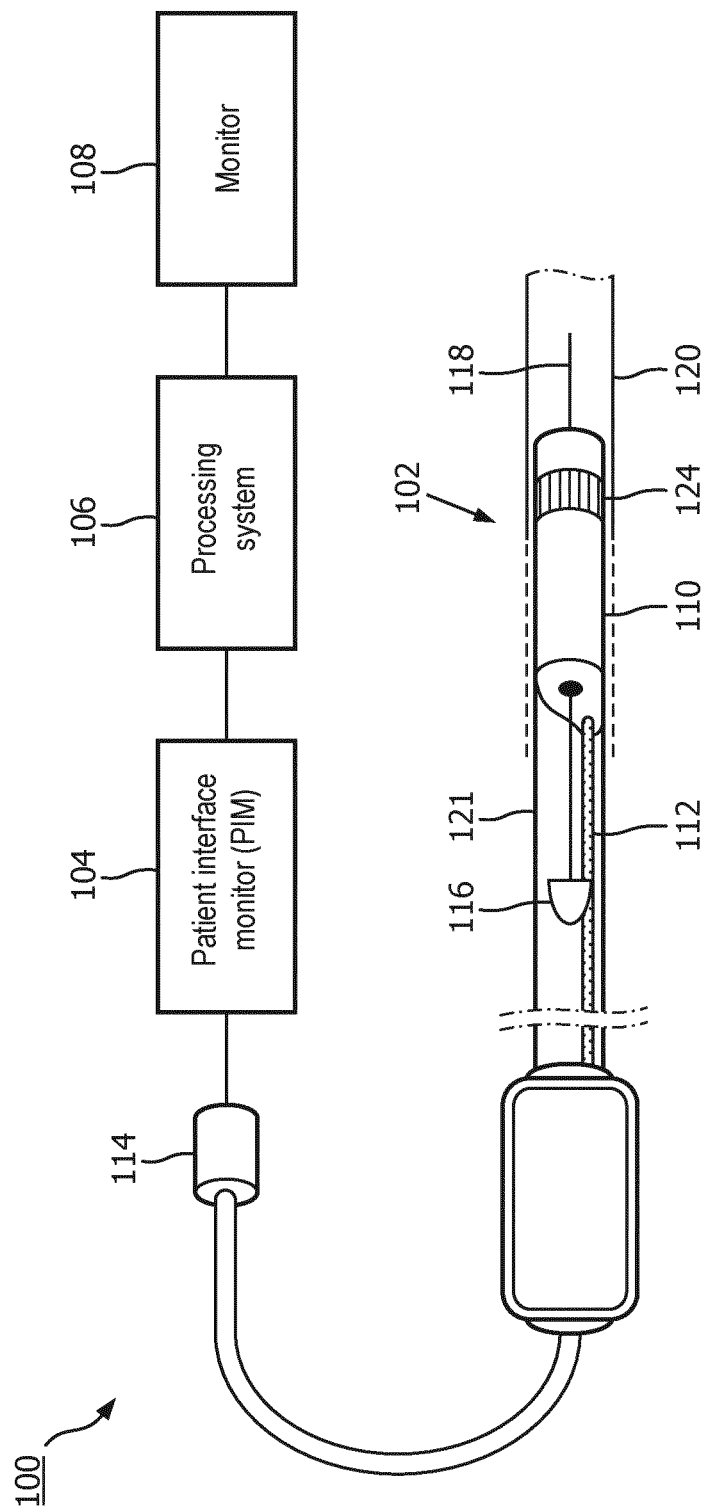
FIG. 1 is a diagrammatic schematic view of an intraluminal imaging system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. For example, while the focusing system is described in terms of cardiovascular imaging, it is understood that it is not intended to be limited to this application. The system is equally well suited to any application requiring imaging within a confined cavity. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic schematic view of an intraluminal imaging system 100, according to aspects of the present disclosure. The intraluminal imaging system 100 can be an ultrasound imaging system. In some instances, the system 100 can be an intravascular ultrasound (IVUS) imaging system. The system 100 may include an intraluminal imaging device 102 such as a catheter, guide wire, or guide catheter, a patient interface module (PIM) 104, an processing system or console 106, and a monitor 108. The intraluminal imaging device 102 can be an ultrasound imaging device. In some instances, the device 102 can be IVUS imaging device, such as a solid-state IVUS device.

At a high level, the IVUS device 102 emits ultrasonic energy from a transducer array 124 included in scanner assembly 110 mounted near a distal end of the catheter device. The ultrasonic energy is reflected by tissue structures in the medium, such as a vessel 120, or another body lumen surrounding the scanner assembly 110, and the ultrasound echo signals are received by the transducer array 124. In that regard, the device 102 can be sized, shaped, or otherwise configured to be positioned within the body lumen of a patient. The PIM 104 transfers the received echo signals to the console or computer 106 where the ultrasound image (including the flow information) is reconstructed and displayed on the monitor 108. The console or computer 106 can include a processor and a memory. The computer or computing device 106 can be operable to facilitate the features of the IVUS imaging system 100 described herein. For example, the processor can execute computer readable instructions stored on the non-transitory tangible computer readable medium.

The PIM 104 facilitates communication of signals between the IVUS console 106 and the scanner assembly 110 included in the IVUS device 102. This communication includes the steps of: (1) providing commands to integrated circuit controller chip(s) 206A, 206B, illustrated in FIG. 2, included in the scanner assembly 110 to select the particular transducer array element(s), or acoustic element(s), to be used for transmit and receive, (2) providing the transmit trigger signals to the integrated circuit controller chip(s) 206A, 206B included in the scanner assembly 110 to activate the transmitter circuitry to generate an electrical pulse to excite the selected transducer array element(s), and/or (3) accepting amplified echo signals received from the selected transducer array element(s) via amplifiers included on the integrated circuit controller chip(s) 126 of the scanner assembly 110. In some embodiments, the PIM 104 performs preliminary processing of the echo data prior to relaying the data to the console 106. In examples of such embodiments, the PIM 104 performs amplification, filtering, and/or aggregating of the data. In an embodiment, the PIM 104 also supplies high- and low-voltage DC power to support operation of the device 102 including circuitry within the scanner assembly 110.

The IVUS console 106 receives the echo data from the scanner assembly 110 by way of the PIM 104 and processes the data to reconstruct an image of the tissue structures in the medium surrounding the scanner assembly 110. The console 106 outputs image data such that an image of the vessel 120, such as a cross-sectional image of the vessel 120, is displayed on the monitor 108. Vessel 120 may represent fluid filled or surrounded structures, both natural and man-made. The vessel 120 may be within a body of a patient. The vessel 120 may be a blood vessel, as an artery or a vein of a patient's vascular system, including cardiac vasculature, peripheral vasculature, neural vasculature, renal vasculature, and/or or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

Figure 2:
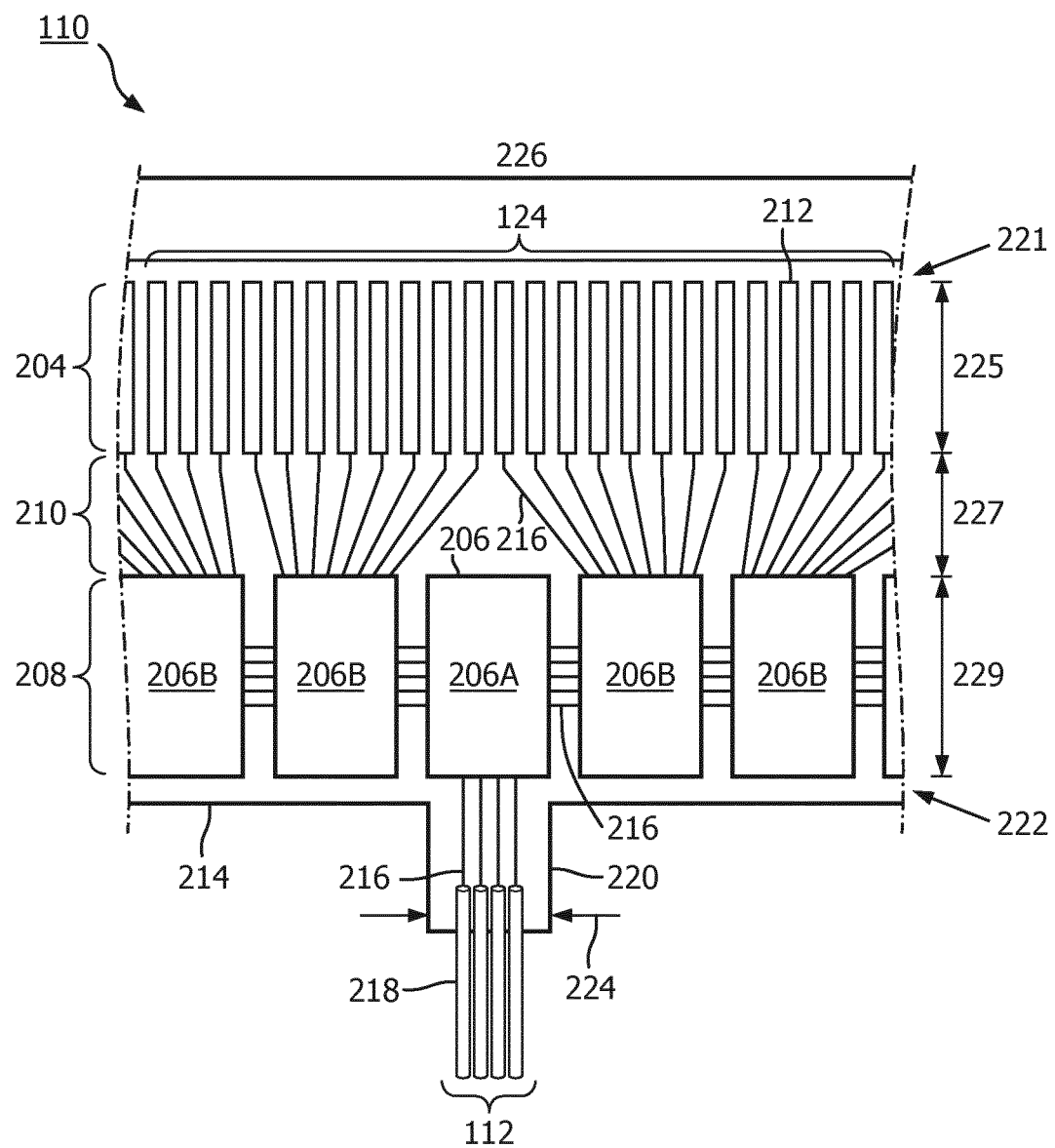
FIG. 2 is a diagrammatic perspective view of the top of a scanner assembly in a flat configuration, according to aspects of the present disclosure.

In some embodiments, the IVUS device includes some features similar to traditional solid-state IVUS catheters, such as the EagleEye® catheter available from Volcano Corporation and those disclosed in U.S. Pat. No. 7,846,101 hereby incorporated by reference in its entirety. For example, the IVUS device 102 includes the scanner assembly 110 near a distal end of the device 102 and a transmission line bundle 112 extending along the longitudinal body of the device 102. The transmission line bundle or cable 112 can include a plurality of conductors, including one, two, three, four, five, six, seven, or more conductors 218 (FIG. 2). It is understood that any suitable gauge wire can be used for the conductors 218. In an embodiment, the cable 112 can include a four-conductor transmission line arrangement with, e.g., 41 AWG gauge wires. In an embodiment, the cable 112 can include a seven-conductor transmission line arrangement utilizing, e.g., 44 AWG gauge wires. In some embodiments, 43 AWG gauge wires can be used.

The transmission line bundle 112 terminates in a PIM connector 114 at a proximal end of the device 102. The PIM connector 114 electrically couples the transmission line bundle 112 to the PIM 104 and physically couples the IVUS device 102 to the PIM 104. In an embodiment, the IVUS device 102 further includes a guide wire exit port 116. Accordingly, in some instances the IVUS device is a rapid-exchange catheter. The guide wire exit port 116 allows a guide wire 118 to be inserted towards the distal end in order to direct the device 102 through the vessel 120.

FIG. 2 is a diagrammatic top view of a portion of a flexible assembly 200, according to aspects of the present disclosure. For the purposes of this disclosure, the flexible assembly 200 may also be referred to as an ultrasound scanner circuit. The flexible assembly 200 includes a transducer array 124 formed in a transducer region 204 and transducer control logic dies 206 (including dies 206A and 206B) formed in a control region 208, with a transition region 210 disposed therebetween. The transducer array 124 includes an array of ultrasound transducers 212. The transducer control logic dies 206 are mounted on a flexible substrate 214 into which the transducers 212 have been previously integrated. The flexible substrate 214 is shown in a flat configuration in FIG. 2. Though six control logic dies 206 are shown in FIG. 2, any number of control logic dies 206 may be used. For example, one, two, three, four, five, six, seven, eight, nine, ten, or more control logic dies 206 may be used.

The flexible substrate 214, on which the transducer control logic dies 206 and the transducers 212 are mounted, provides structural support and interconnects for electrical coupling. The flexible substrate 214 may be constructed to include a film layer of a flexible polyimide material such as KAPTON™ (trademark of DuPont). Other suitable materials include polyester films, polyimide films, polyethylene napthalate films, or polyetherimide films, liquid crystal polymer, other flexible printed semiconductor substrates as well as products such as Upilex® (registered trademark of Ube Industries) and TEFLON® (registered trademark of E.I. du Pont). In the flat configuration illustrated in FIG. 2, the flexible substrate 214 has a generally rectangular shape. As shown and described herein, the flexible substrate 214 is configured to be wrapped around a support member 230 (FIG. 3) in some instances. Therefore, the thickness of the film layer of the flexible substrate 214 is generally related to the degree of curvature in the final assembled flexible assembly 110. In some embodiments, the film layer is between 5 μm and 100 μm, with some particular embodiments being between 5 μm and 25.1 μm, e.g., 6 μm.

The transducer control logic dies 206 is a non-limiting example of a control circuit. The transducer region 204 is disposed at a distal portion 221 of the flexible substrate 214. The control region 208 is disposed at a proximal portion 222 of the flexible substrate 214. The transition region 210 is disposed between the control region 208 and the transducer region 204. Dimensions of the transducer region 204, the control region 208, and the transition region 210 (e.g., lengths 225, 227, 229) can vary in different embodiments. In some embodiments, the lengths 225, 227, 229 can be substantially similar or, the length 227 of the transition region 210 may be less than lengths 225 and 229, the length 227 of the transition region 210 can be greater than lengths 225, 229 of the transducer region and controller region, respectively.

The control logic dies 206 are not necessarily homogenous. In some embodiments, a single controller is designated a master control logic die 206A and contains the communication interface for cable 142 which may serve as an electrical conductor, e.g., electrical conductor 112, between a processing system, e.g., processing system 106, and the flexible assembly 200. Accordingly, the master control circuit may include control logic that decodes control signals received over the cable 142, transmits control responses over the cable 142, amplifies echo signals, and/or transmits the echo signals over the cable 142. The remaining controllers are slave controllers 206B. The slave controllers 206B may include control logic that drives a transducer 212 to emit an ultrasonic signal and selects a transducer 212 to receive an echo. In the depicted embodiment, the master controller 206A does not directly control any transducers 212. In other embodiments, the master controller 206A drives the same number of transducers 212 as the slave controllers 206B or drives a reduced set of transducers 212 as compared to the slave controllers 206B. In an exemplary embodiment, a single master controller 206A and eight slave controllers 206B are provided with eight transducers assigned to each slave controller 206B.

To electrically interconnect the control logic dies 206 and the transducers 212, in an embodiment, the flexible substrate 214 includes conductive traces 216 formed in the film layer that carry signals between the control logic dies 206 and the transducers 212. In particular, the conductive traces 216 providing communication between the control logic dies 206 and the transducers 212 extend along the flexible substrate 214 within the transition region 210. In some instances, the conductive traces 216 can also facilitate electrical communication between the master controller 206A and the slave controllers 206B. The conductive traces 216 can also provide a set of conductive pads that contact the conductors 218 of cable 142 when the conductors 218 of the cable 142 are mechanically and electrically coupled to the flexible substrate 214. Suitable materials for the conductive traces 216 include copper, gold, aluminum, silver, tantalum, nickel, and tin, and may be deposited on the flexible substrate 214 by processes such as sputtering, plating, and etching. In an embodiment, the flexible substrate 214 includes a chromium adhesion layer. The width and thickness of the conductive traces 216 are selected to provide proper conductivity and resilience when the flexible substrate 214 is rolled. In that regard, an exemplary range for the thickness of a conductive trace 216 and/or conductive pad is between 1-5 µm. For example, in an embodiment, 5 µm conductive traces 216 are separated by 5 µm of space. The width of a conductive trace 216 on the flexible substrate may be further determined by the width of the conductor 218 to be coupled to the trace/pad.

The flexible substrate 214 can include a conductor interface 220 in some embodiments. The conductor interface 220 can be a location of the flexible substrate 214 where the conductors 218 of the cable 142 are coupled to the flexible substrate 214. For example, the bare conductors of the cable 142 are electrically coupled to the flexible substrate 214 at the conductor interface 220. The conductor interface 220 can be tab extending from the main body of flexible substrate 214. In that regard, the main body of the flexible substrate 214 can refer collectively to the transducer region 204, controller region 208, and the transition region 210. In the illustrated embodiment, the conductor interface 220 extends from the proximal portion 222 of the flexible substrate 214. In other embodiments, the conductor interface 220 is positioned at other parts of the flexible substrate 214, such as the distal portion 221, or the flexible substrate 214 may lack the conductor interface 220. A value of a dimension of the tab or conductor interface 220, such as a width 224, can be less than the value of a dimension of the main body of the flexible substrate 214, such as a width 226. In some embodiments, the substrate forming the conductor interface 220 is made of the same material(s) and/or is similarly flexible as the flexible substrate 214. In other embodiments, the conductor interface 220 is made of different materials and/or is comparatively more rigid than the flexible substrate 214. For example, the conductor interface 220 can be made of a plastic, thermoplastic, polymer, hard polymer, etc., including polyoxymethylene (e.g., DELRIN®), polyether ether ketone (PEEK), nylon, Liquid Crystal Polymer (LCP), and/or other suitable materials.

Figure 3:
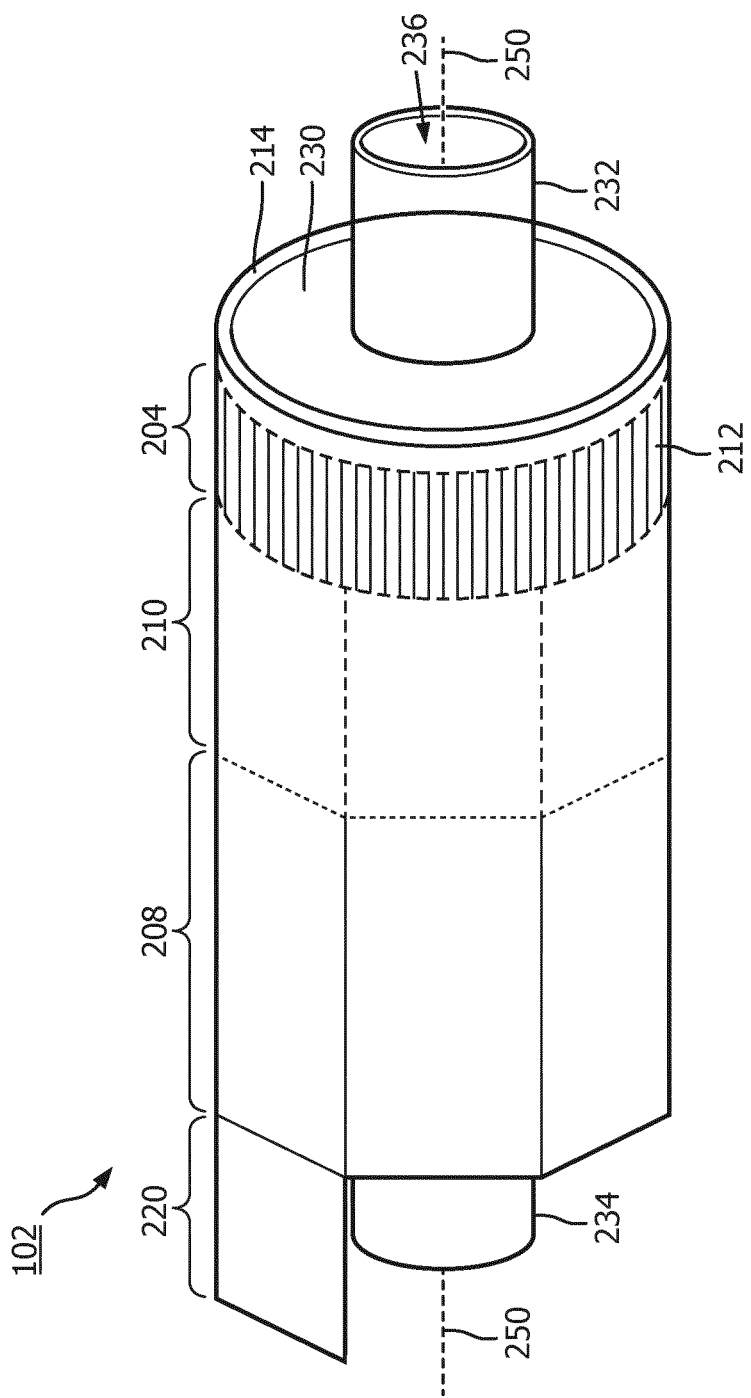
FIG. 3 is a diagrammatic perspective view of the scanner assembly shown in FIG. 2 in a rolled configuration around a support member, according to aspects of the present disclosure.

FIG. 3 illustrates a perspective view of the device 102 with the scanner assembly 110 in a rolled configuration. In some instances, the assembly 110 is transitioned from a flat configuration (FIG. 2) to a rolled or more cylindrical configuration (FIG. 3). For example, in some embodiments, techniques are utilized as disclosed in one or more of U.S. Pat. No. 6,776,763, titled "ULTRASONIC TRANSDUCER ARRAY AND METHOD OF MANUFACTURING THE SAME" and U.S. Pat. No. 7,226,417, titled "HIGH RESOLUTION INTRAVASCULAR ULTRASOUND SENSING ASSEMBLY HAVING A FLEXIBLE SUBSTRATE," each of which is hereby incorporated by reference in its entirety.

In some embodiments, the transducer elements 212 and/or the controllers 206 can be positioned in in an annular configuration, such as a circular configuration or in a polygon configuration, around a longitudinal axis 250 of a support member 230. It will be understood that the longitudinal axis 250 of the support member 230 may also be referred to as the longitudinal axis of the scanner assembly 110, the flexible elongate member 121, and/or the device 102. For example, a cross-sectional profile of the imaging assembly 110 at the transducer elements 212 and/or the controllers 206 can be a circle or a polygon. Any suitable annular polygon shape can be implemented, such as a based on the number of controllers/transducers, flexibility of the controllers/transducers, etc., including a pentagon, hexagon, heptagon, octagon, nonagon, decagon, etc. In some examples, the plurality of transducer controllers 206 may be used for controlling the plurality of ultrasound transducer elements 212 to obtain imaging data associated with the vessel 120.

The support member 230 can be referenced as a unibody in some instances. The support member 230 can be composed of a metallic material, such as stainless steel, or non-metallic material, such as a plastic or polymer as described in U.S. Provisional Application No. 61/985,220, "Pre-Doped Solid Substrate for Intravascular Devices," filed Apr. 28, 2014, the entirety of which is hereby incorporated by reference herein. The support member 230 can be a ferrule having a distal flange or portion 232 and a proximal flange or portion 234. The support member 230 can be tubular in shape and define a lumen 236 extending longitudinally therethrough. The lumen 236 can be sized and shaped to receive the guide wire 118. The support member 230 can be manufactured using any suitable process. For example, the support member 230 can be machined and/or electrochemically machined or laser milled, such as by removing material from a blank to shape the support member 230, or molded, such as by an injection molding process.

Figure 4:
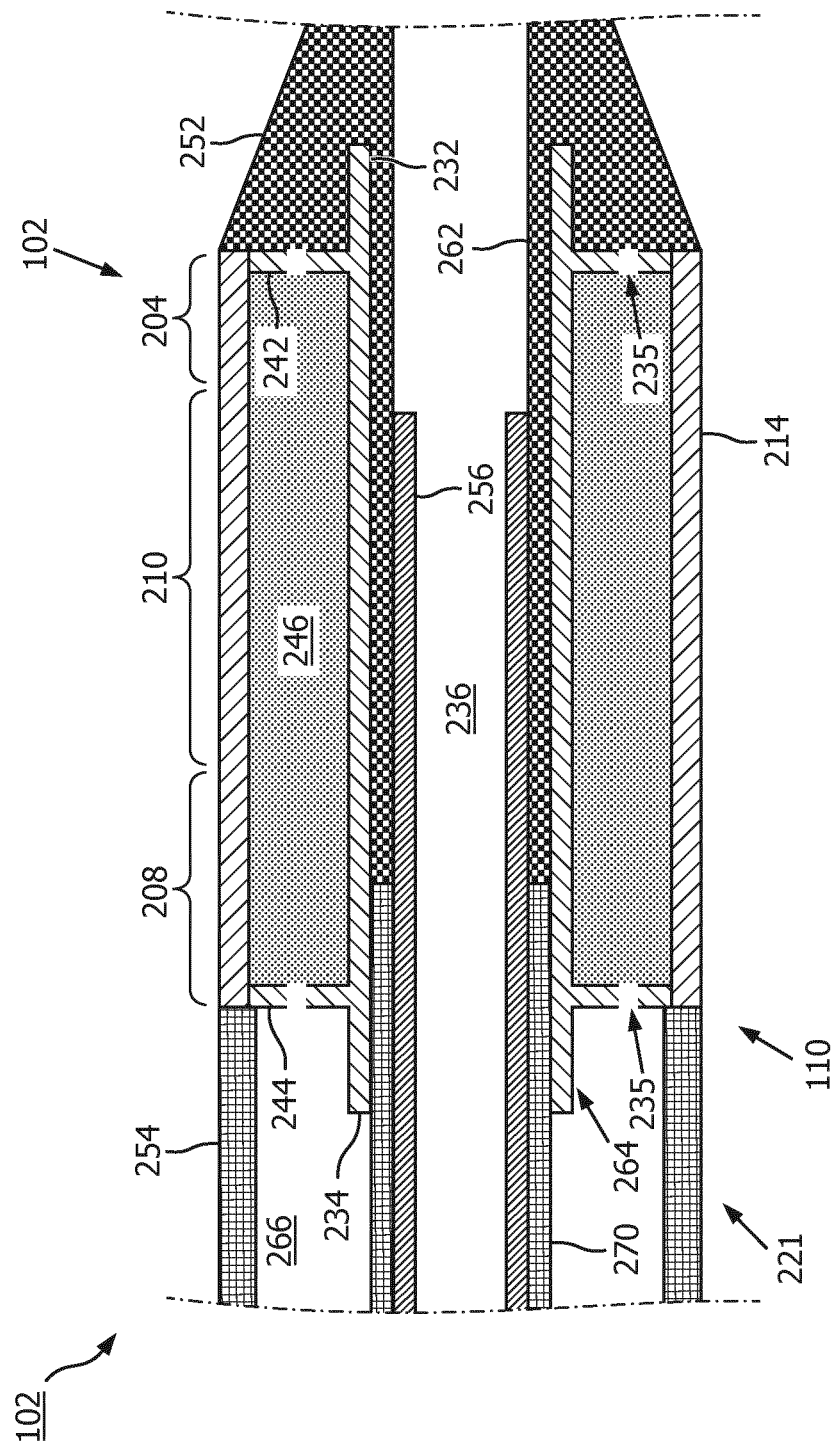
FIG. 4 is a diagrammatic cross-sectional side view of the scanner assembly shown in FIG. 3, according to aspects of the present disclosure.

Referring now to FIG. 4, shown there is a diagrammatic cross-sectional side view of a distal portion of the intraluminal imaging device 102, including the flexible substrate 214 and the support member 230, according to aspects of the present disclosure. The support member 230 can be referenced as a unibody in some instances. The support member 230 can be composed of a metallic material, such as stainless steel, or non-metallic material, such as a plastic or polymer as described in U.S. Provisional Application No. 61/985,220, "Pre-Doped Solid Substrate for Intravascular Devices," filed Apr. 28, 2014, the entirety of which is hereby incorporated by reference herein. The support member 230 can be ferrule having a distal portion 262 and a proximal portion 264. The support member 230 can define a lumen 236 extending along the longitudinal axis LA. The lumen 236 is in communication with the entry/exit port 116 and is sized and shaped to receive the guide wire 118 (FIG. 1). The support member 230 can be manufactured according to any suitable process. For example, the support member 230 can be machined and/or electrochemically machined or laser milled, such as by removing material from a blank to shape the support member 230, or molded, such as by an injection molding process. In some embodiments, the support member 230 may be integrally formed as a unitary structure, while in other embodiments the support member 230 may be formed of different components, such as a ferrule and stands 242, 244, that are fixedly coupled to one another. In some cases, the support member 230 and/or one or more components thereof may be completely integrated with inner member 256. In some cases, the inner member 256 and the support member 230 may be joined as one, e.g., in the case of a polymer support member.

Stands 242, 244 that extend vertically are provided at the distal and proximal portions 262, 264, respectively, of the support member 230. The stands 242, 244 elevate and support the distal and proximal portions of the flexible substrate 214. In that regard, portions of the flexible substrate 214, such as the transducer portion 204 (or transducer region 204), can be spaced from a central body portion of the support member 230 extending between the stands 242, 244. The stands 242, 244 can have the same outer diameter or different outer diameters. For example, the distal stand 242 can have a larger or smaller outer diameter than the proximal stand 244 and can also have special features for rotational alignment as well as control chip placement and connection. To improve acoustic performance, any cavities between the flexible substrate 214 and the surface of the support member 230 are filled with a backing material 246. The liquid backing material 246 can be introduced between the flexible substrate 214 and the support member 230 via passageways 235 in the stands 242, 244. In some embodiments, suction can be applied via the passageways 235 of one of the stands 242, 244, while the liquid backing material 246 is fed between the flexible substrate 214 and the support member 230 via the passageways 235 of the other of the stands 242, 244. The backing material can be cured to allow it to solidify and set. In various embodiments, the support member 230 includes more than two stands 242, 244, only one of the stands 242, 244, or neither of the stands. In that regard the support member 230 can have an increased diameter distal portion 262 and/or increased diameter proximal portion 264 that is sized and shaped to elevate and support the distal and/or proximal portions of the flexible substrate 214.

The support member 230 can be substantially cylindrical in some embodiments. Other shapes of the support member 230 are also contemplated including geometrical, non-geometrical, symmetrical, non-symmetrical, cross-sectional profiles. As the term is used herein, the shape of the support member 230 may reference a cross-sectional profile of the support member 230. Different portions the support member 230 can be variously shaped in other embodiments. For example, the proximal portion 264 can have a larger outer diameter than the outer diameters of the distal portion 262 or a central portion extending between the distal and proximal portions 262, 264. In some embodiments, an inner diameter of the support member 230 (e.g., the diameter of the lumen 236) can correspondingly increase or decrease as the outer diameter changes. In other embodiments, the inner diameter of the support member 230 remains the same despite variations in the outer diameter.

A proximal inner member 256 and a proximal outer member 254 are coupled to the proximal portion 264 of the support member 230. The proximal inner member 256 and/or the proximal outer member 254 can comprise a flexible elongate member. The proximal inner member 256 can be received within a proximal flange 234 and extend through a portion of the length of the lumen 236 of the support member 230. The proximal outer member 254 abuts and is in contact with the flexible substrate 214. A distal member 252 is coupled to the distal portion 262 of the support member 230. For example, the distal member 252 is positioned around the distal flange 232. The distal member 252 can abut and be in contact with the flexible substrate 214 and the stand 242. The distal member 252 can be the distal-most component of the intraluminal imaging device 102. The distal tip member 252 comprises a proximally extending portion 268 that extends within the lumen and overlaps the inner member 256. In some embodiments, the inner member 256 can extend past the distal portion 262 of the support member 230. In some embodiments, the proximally extended portion 268 of the distal tip member 252 can extend proximally of the proximal portion 264 of the support member 230. The proximally extending portion 268 can form a lap joint with the inner member 256 using a thermal bond and/or an adhesive.

Due to the difference in mechanical properties of the rigid support member 230 and the relatively flexible inner and outer members 256, 254, the transition between the support member 230 and the inner and outer members 256, 254, can experience significant stress. This concentrated stress can lead to kinking of the inner and outer members 256, 254, which can adversely affect the structural integrity and performance of the device 102. Substituting the relatively flexible materials of the inner and/or outer members 256, 254 for more rigid materials may adversely affect the maneuverability and/or durability of the device. Furthermore, it is desirable to maintain a small and substantially uniform outer profile of the device 102 along its length. Accordingly, a strain relief layer 270 is positioned around the proximal inner member 256 and within the proximal flange 234, such that the strain relief layer 270 overlaps the inner member 256 within the proximal flange 234. Thus, the strain relief layer 270 is positioned radially between the inner member 256 and the support member 330 at a proximal portion of the support member 330.

The strain relief layer 270 can comprise a flexible material, such as a polyether block amide heat shrink tube. For example, the strain relief layer 270 can include a Pebax® 6333 SA01 tubing, manufactured by Arkema. However, any suitable flexible material can be used, including high density polyethylene (HDPE), Nylon, PET, PTFE, HDPE and LDPE. The inner member 256 can comprise the same material as the strain relief layer 270, or a different material. In one embodiment, the inner member comprises Alathon® H5618 HDPE, manufactured by Lyondell. In another embodiment, the inner member 256 comprises a combination or blend of different materials, such HDPE and one or more polyolefins. For example, in some embodiments, the inner member comprises a combination of Alathon® H5618 HDPE and Orevac® 18307, manufactured by Arkema. However, any suitable flexible material can be used, including all types of Nylon, PET, and Polypropylene.

In that regard, the stiffness and/or thickness of the material used for the strain relief layer 270 can be selected to provide a transition in stiffness between the stiff support member 230 and the relatively flexible inner member 256 and outer member 254. In this way, the strain relief layer 270 can prevent kinking of the flexible inner member 256 and outer member 254, particularly in the transition region just proximal of the support member 230. The thickness of the strain relief layer 270 can range from approximately 0.013 mm to approximately 0.051 mm, including values such as 0.025 and 0.032 mm.

It will be understood that although embodiments of the present disclosure are described in the context of IVUS imaging, the present disclosure is applicable to other types of intraluminal imaging and/or therapeutic devices. For example, the present disclosure contemplates intraluminal devices (guidewire, catheter, or guide member) configured for any suitable purpose (e.g., sensing or therapy) in addition to or in lieu of IVUS imaging. The embodiments described provide particular structural arrangements of components that facilitate a gradual transition in stiffness from a rigid component (e.g., imaging assembly, therapeutic device) and an elongate flexible component (e.g., catheter, guidewire, guide member). In that regard, the embodiments and concepts described herein are applicable to any intraluminal device that has a sharp transition between a flexible component and a rigid component. In particular, the embodiments and concepts of the present disclosure can be used in a variety of intraluminal diagnostic devices such as optical coherence tomography (OCT) devices, intravascular photoacoustic imaging (IVPA) devices, forward looking IVUS (FL-IVUS) devices, intravascular pressure sensing devices, blood flow measurement devices, temperature sensing devices, etc. Additionally, the embodiments of the present disclosure are applicable in a variety of intraluminal therapeutic devices such as ablation devices, atherectomy devices, drug-coated balloon delivery devices, scoring balloon delivery devices, cutting tools, radiofrequency devices, aspiration devices, stent delivery devices, and/or other suitable devices.

Figure 5:
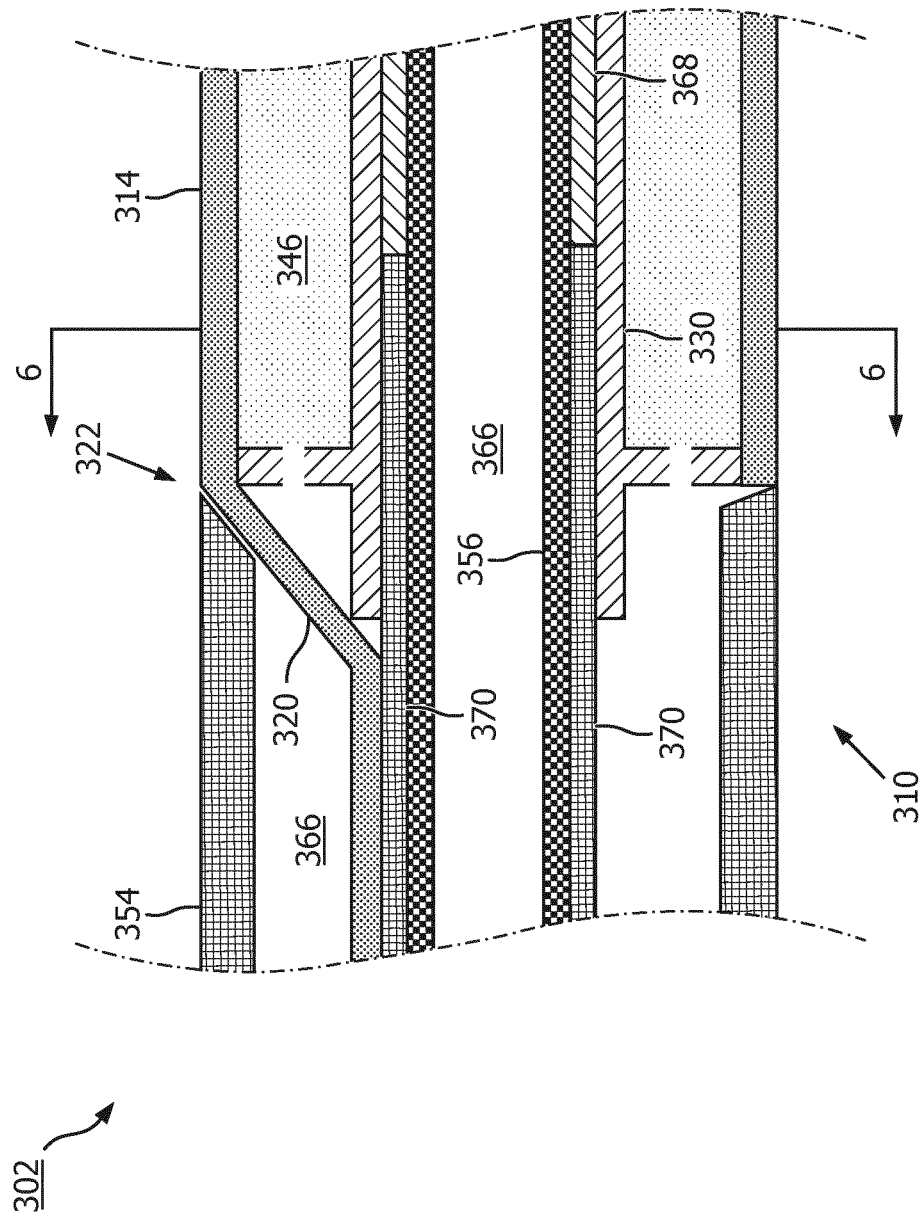
FIG. 5 is a diagrammatic cross-sectional side view of a transition region of a scanner assembly, according to aspects of the present disclosure.

FIG. 5 is a diagrammatic cross-sectional view showing a transition region of an intravascular device 302 that includes a strain relief layer 370 around a proximal inner member 356. In some aspects, the intravascular device 302 shown in FIG. 5 can include similar or identical components as the device 102 shown in FIG. 4. For example, the device 302 shown in FIG. 5 includes a flex circuit 314 or flexible substrate positioned around a support member 330 that includes a proximal flange 334, and a proximal inner member 356 and a strain relief layer 370 positioned partially within the proximal flange 334.

The strain relief layer 370 includes a heat shrink tubing applied around the inner member 356. The inner member 356 and strain relief layer 370 are inserted into the lumen 336 of the support member 330, such that the strain relief layer 370 extends partially within the support member 330. The interface portion 320 of the flex circuit 314 is positioned over and coupled to the strain relief layer 370. Finally, the proximal outer member 354 is positioned over the inner member 356 and the strain relief layer 370 and coupled to the support member 330 and/or the flex circuit 314 at a proximal portion 322 of the support member flex circuit 314. In some embodiments, the outer member 354 is coupled to the proximal portion of the flex circuit 314 using at least one of an interference fit, an adhesive, or a thermal bond.

The strain relief layer 370 is positioned within the support member 330 such that a proximal portion of the strain relief layer 370 extends proximally of the proximal flange 334 of the support member 330, while a distal portion of the strain relief layer extends within the support member 330. As explained further below, in an exemplary embodiment, the distal portion of the strain relief layer 370 that extends within the support member 330 is shorter than the proximal portion of the strain relief layer 370 that extends proximally outside the support member 330. For example, the proximal portion may be approximately 8-9 mm, while the distal portion is 1-2 mm. However, the length of the strain relief layer can be longer or shorter in some embodiments, such as between 2 mm and 20 mm, including values such as 5 mm, 8 mm, 12 mm, or 15 mm. Furthermore, the amount of the strain relief layer's length that is positioned within the support member 330 can be greater or less than 1-2 mm, such as 0.5 mm, 2.5 mm, 3.0 mm, 3.5 mm, or any other suitable portion of the strain relief layer's length. Adjusting the proportion of the strain relief layer that extends proximally of the support member 330 can advantageously improve or optimize the strain-relieving properties of the strain relief layer 370.

Figure 6B:
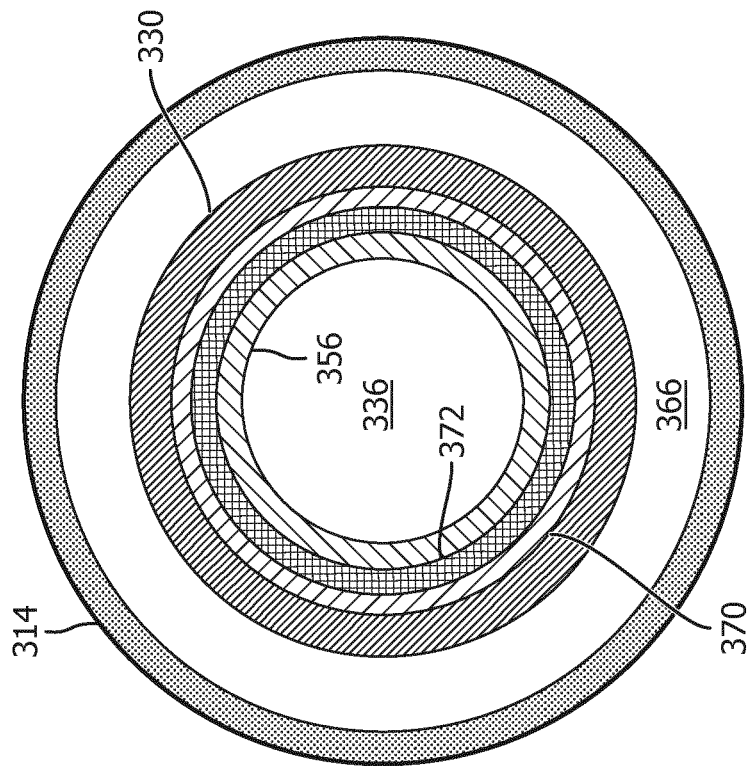
FIGS. 6A and 6B are diagrammatic cross-sectional views of the scanner assembly shown in FIG. 5, taken along line 6-6, according to aspects of the present disclosure.
Figure 6A:
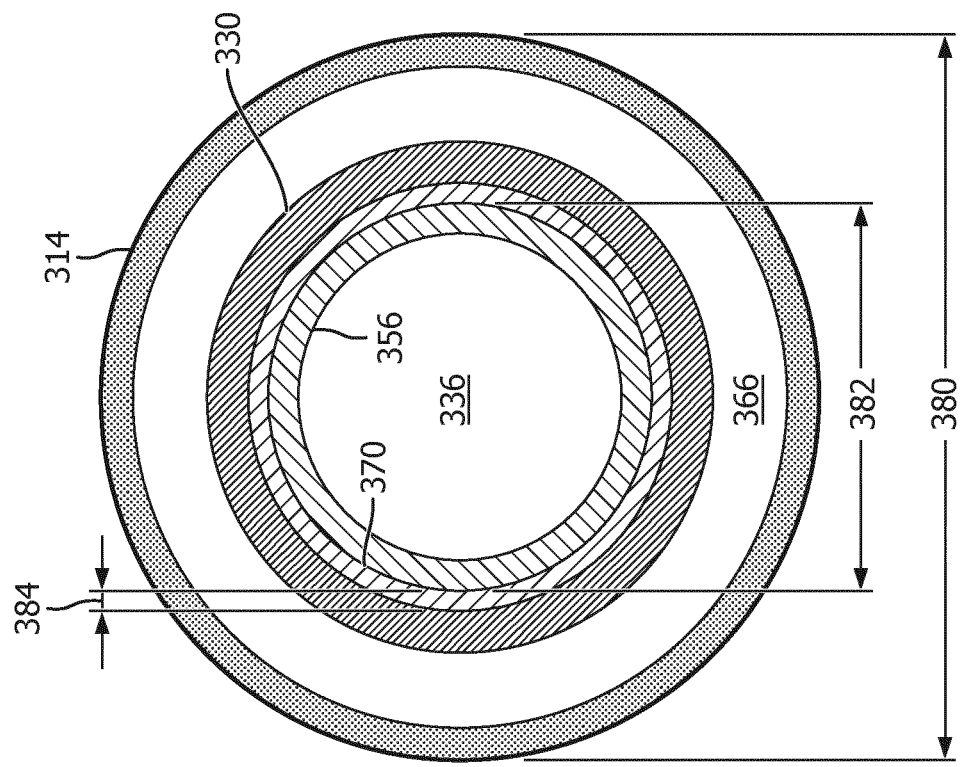

FIG. 6A is a cross-sectional view of the device 302 shown in FIG. 5 taken along the line 6-6, according to one aspect of the present disclosure. The cross-sectional view shows the strain relief layer 370 positioned around the inner member 356, which is positioned inside the support member 330 or hypotube. In the embodiment of FIG. 6A, the strain relief layer 370 is in direct physical contact with the inner member 356 and is fixedly coupled to the inner member 356 without the use of adhesives. For example, the strain relief layer 370 can comprise a heat shrink tubing that is positioned around inner member 356, and then shrunk by applying heat, creating a physical connection between the strain relief layer and the inner member. The inner member 356 and strain relief layer 370 are positioned inside the support member 330, such that the strain relief layer 370 is in direct physical contact with the support member 330. The flex circuit 314 is positioned around the support member 330, as illustrated in FIG. 5.

The device 302 comprises a first diameter or width 380, which is measured as the diameter of the flex circuit 314. In an exemplary embodiment, the first diameter is less than 0.04 in., such that the device 302 can navigate tortuous regions of the vasculature. However, the first diameter can range between 0.03 in. and 0.11 in., including values such as 0.033, 0.039, 0.0455 and 0.107 in. The inner member comprises a second width or diameter 382. In an exemplary embodiment, the second width 382 is approximately 0.015 in. However, the second diameter can range between 0.010 and 0.035 in., including values such as 0.02, 0.025, and 0.030 in. In some embodiments, the ratio of the first diameter 380 to the second diameter 382 can be 4:1, 3:1, 2:1, or any other suitable ratio in which the first diameter 380 is larger than the second diameter 382. Furthermore, the strain relief layer 370 comprises a wall thickness 384. In an exemplary embodiment, the wall thickness 384 is approximately 0.001 in. However, in other embodiments, the wall thickness 384 can be between approximately 0.00025 and 0.002 in., including values such as 0.0005, 0.00125, and 0.0015 in. It will be understood that the dimensions described above are exemplary, and can be modified as necessary to achieve the desired mechanical performance and physical characteristics of the device.

FIG. 6B is a cross-sectional view of the device 302 shown in FIG. 5 taken along the line 6-6, according to another embodiment of the present disclosure. In the embodiment shown in FIG. 6B, the strain relief layer 370 is coupled to the inner member by an adhesive layer 372 that is positioned between the inner member 356 and the strain relief layer 370. In that regard, in some embodiments, the strain relief layer 370 comprises a flexible material that is not a heat shrink tubing. The adhesive layer 372 can be applied to the inner member and/or to the strain relief layer 370 before being positioned around the inner member 356. In an exemplary embodiment, the adhesive layer 372 comprises a flexible adhesive material to allow the catheter to flex and bend while navigating through tortuous regions of the vasculature. The adhesive layer 372 can include any suitable adhesive, including Epoxy, UV Light Cure, and/or instant adhesive. In other embodiments, the strain relief layer 370 can be co-extruded with the inner member 356.

Figure 7:
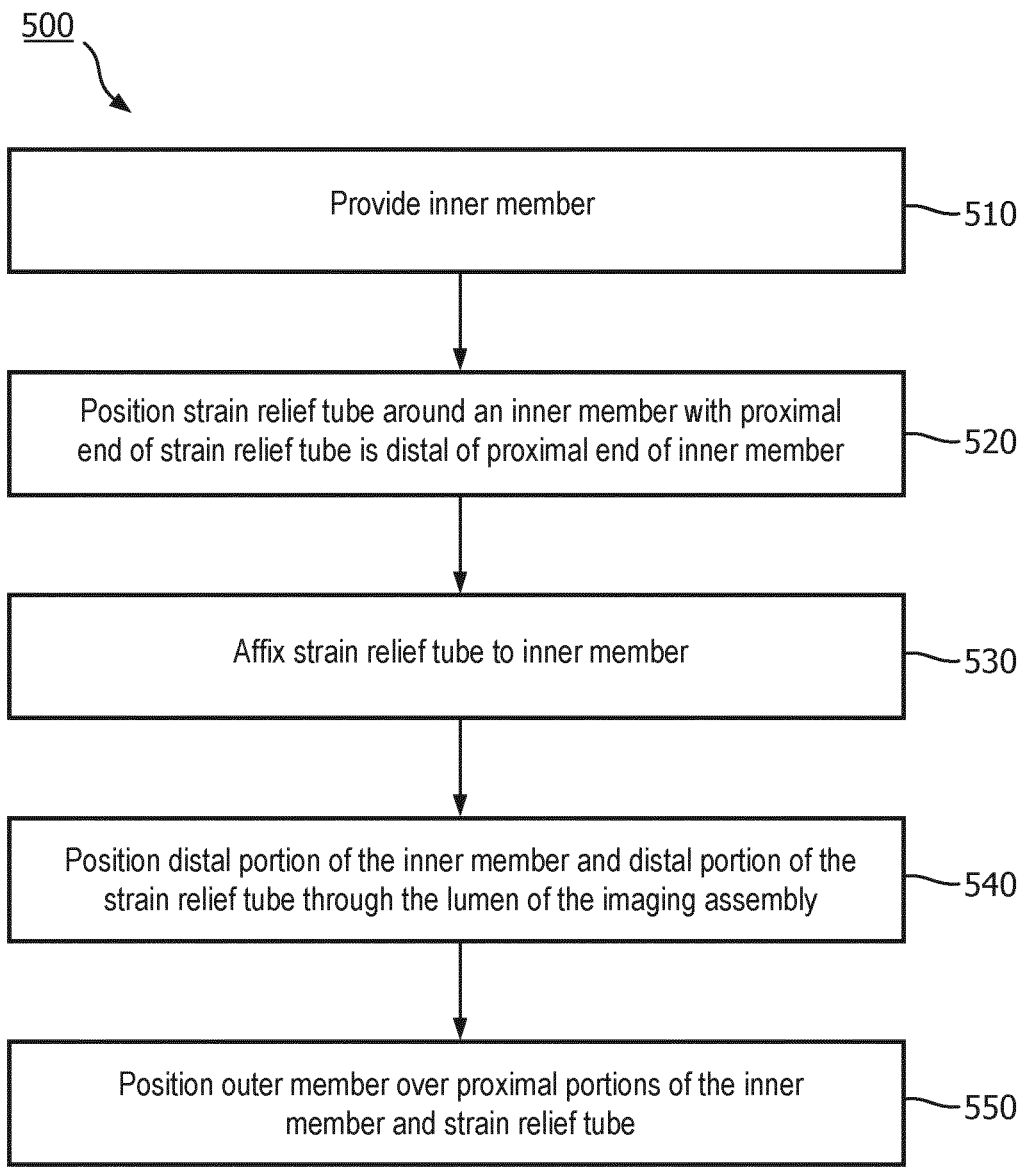
FIG. 7 is a flow diagram of a method for assembling an intravascular imaging device, according to aspects of the present disclosure.
Figure 8A:
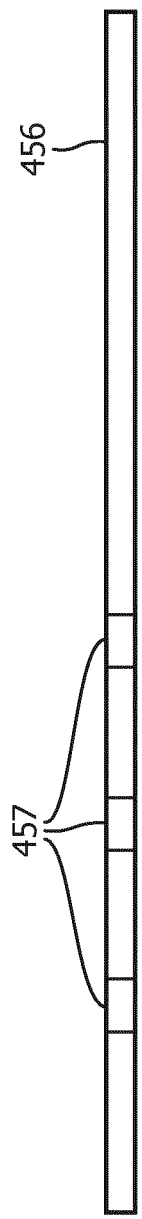
FIGS. 8A, 8B, 8C, 8D, and 8E are side elevation views of an intravascular imaging device at various points in an assembly process, according to aspects of the present disclosure.
Figure 8B:
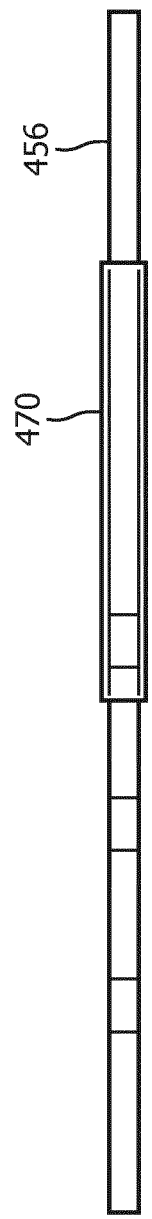

FIGS. 7 and 8A-8E illustrate a method for assembling an intraluminal ultrasound imaging device that includes a strain relief layer. Specifically, FIG. 7 is a flow diagram illustrating various steps of a method 500 for assembling the intraluminal ultrasound imaging device. FIGS. 8A-8E show the intraluminal ultrasound imaging device at various points in the assembly process. Referring to FIGS. 7 and 8A, in step 510, an inner member 456 is provided. The inner member 456 comprises a flexible tubing and a plurality of radiopaque marker bands 457 positioned around a circumference of the inner member 456. The inner member 456 can include a unitary extruded tube, or can comprise multiple layers of one or more materials. The marker bands 457 are swaged on the inner member 456 and positioned approximately 10 mm from one another. In other embodiments, the space between the marker bands 457 can be larger or smaller, including approximately 5 mm, 8 mm, 12 mm, 15 mm, or 20 mm. Referring to FIGS. 7 and 8B, in step 520, a strain relief layer 470 is positioned around the inner member 456. In an exemplary embodiment, the strain relief layer 470 comprises a heat shrink tube. The strain relief layer or tube 470 is positioned such that the proximal end of the strain relief tube 470 is distal of the proximal end of the inner member 456. In other words, the inner member 456 extends proximally of the proximal end of the strain relief tube 470. In the embodiment shown in FIG. 8B, the strain relief tube 470 is positioned over one of the marker bands 457. In other embodiments, the strain relief tube 470 is positioned such that it does not overlap any marker bands 457.

In step 530, the strain relief tube 470 is affixed to the inner member 456. In an exemplary embodiment, the strain relief tube 470 is affixed to the inner member 456 by heat shrinking the strain relief tube 470 to the inner member 456. In this manner, the outer profile of the device can be reduced, and the number of components needed to assemble the intravascular imaging device can be minimized. In some embodiments, heat shrinking the strain relief tube 470 to the inner member 456 includes positioning an additional heat shrink mold layer over the strain relief tube 470, and heat shrinking the strain relief tube 470 and the heat shrink mold layer over the inner member 456. In some embodiments, the heat shrink mold layer is removed and discarded after heat shrinking the strain relief tube 470 to the inner member 456. In some embodiments, the heat shrink mold layer comprises a polytetrafluoroethylene (PTFE) tube. The heat shrink mold layer can facilitate a consistent and repeatable assembly process to maintain the outer profile of the device at a desirable size. However, in other embodiments, the strain relief tube 470 is affixed to the inner member 456 using an adhesive layer. In some embodiments, the strain relief tube 470 is affixed to the inner member 456 using a combination of heat shrinking and adhesives.

Figure 8C:
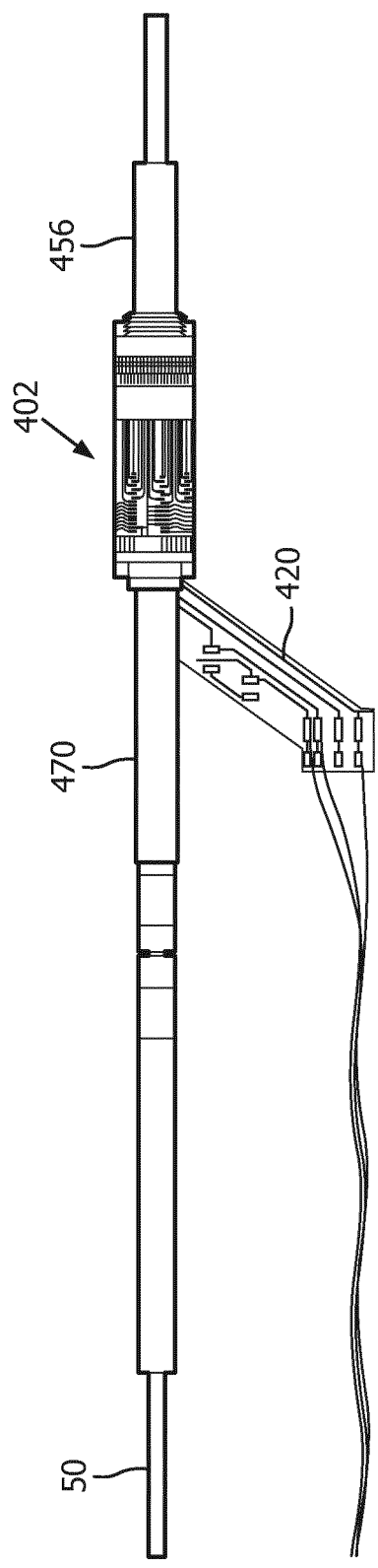

Referring to FIGS. 7 and 8C, in step 540, the distal portions of the inner member 456 and the strain relief tube 470 are positioned through a lumen of an imaging assembly 402. In this way, the strain relief tube 470 provides a transition in stiffness from the stiff imaging assembly 402 to the more flexible inner member 456. This transition can prevent kinking of the intravascular device when the device is navigating tortuous regions of the vasculature, particularly in the area of the transition proximal to the imaging assembly 402. To assist in the assembly process, the inner member 456 is positioned around a processing mandrel 50, which will be removed upon completion of the assembly process. The imaging assembly 402 comprises a flex circuit positioned around a rigid support member, similar to the imaging device 302 shown in FIG. 5. The imaging assembly 402 also includes an interface portion 420 that is coupled to a plurality of communication lines. The communication lines can be attached to the interface portion 420 of the flex circuit 414 before or after the inner member 456 and strain relief rube 470 are inserted into the lumen of the imaging assembly 402.

The lumen of the imaging assembly 402 is sized and shaped to receive the inner member 456 with the strain relief tube 470 positioned around the inner member 456. The inner member 456 and strain relief tube 470 are positioned within the lumen of the imaging assembly 402 such that a portion, but not all, of the strain relief tube 470 extends distally within the lumen of the imaging assembly 402, while a portion of the strain relief tube 470 extends proximally outside of the imaging assembly 402. For example, as described above, the strain relief tube 470 can have a length of approximately 10 mm in one embodiment. By contrast, the inner member 456 can have a length significantly larger than the strain relief layer 470. For example, the length of the inner member can range between 10 inches and 60 inches, including values such as 12 inches, 18 inches, 36 inches, and 48 inches.

Figure 8D:
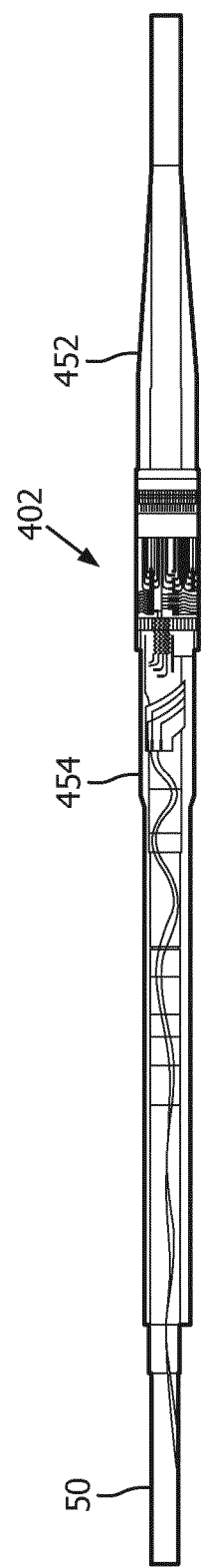
Figure 8E:
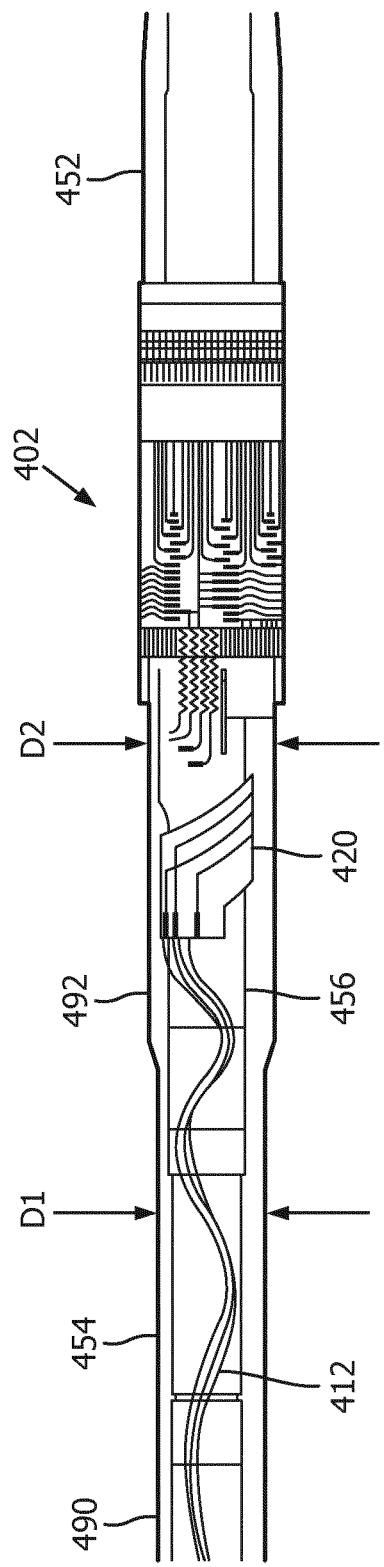

Referring to FIGS. 7 and 8D, in step 550, an outer member 454 is positioned over the inner member 456 and the strain relief tube 470 such that a distal end of the outer member 454 abuts a proximal end of the imaging assembly 402 (shown in more detail in FIG. 8E). In some embodiments, before positioning the outer member 454 over the inner member 456 and the strain relief tube 470, the interface portion 420 of the imaging assembly 402 is wrapped around the portion of the strain relief tube 470 that is proximal of the lumen of the imaging assembly 402. The interface portion 420 can be wrapped around the strain relief tube 470 in a spiral, or helical fashion, as shown in FIG. 8D. In some embodiments, the interface portion 420 is wrapped around the strain relief tube 470 in a circular fashion. In other embodiments, the interface portion 420 is not wrapped around the strain relief tube 470, but instead lies flat against a side of an outer surface of the strain relief tube 470. In some embodiments, the interface portion 420 is affixed to an outer surface of the strain relief tube 470 and/or inner member 456 using an adhesive. A flexible distal dip 452 is coupled to the imaging device 402 such that the distal tip 452 extends distally from the distal end of the imaging device 420. As also shown in FIG. 5, the distal tip 452 may include a tubular member (e.g., 368) positioned inside the lumen of the imaging assembly 402.

FIG. 8E shows a close-up plan view of the assembled intravascular ultrasound imaging device shown in FIG. 8D. As shown in FIG. 8E, the outer member 454 comprises a proximal portion 490 and a distal portion 492. The proximal portion 490 comprises a first outer diameter D1, and the distal portion 492 comprises a larger, second outer diameter D2. In some embodiments, the larger, second outer diameter D2 of the distal portion of the outer member 454 can be formed by flaring, gauging, or otherwise modifying the distal portion 492 of the outer member 454. In that regard, the distal portion 492 may also comprise an inner diameter that is larger than an inner diameter of the proximal portion 490. The larger inner diameter of the distal portion 492 may allow room for the added thickness created by the wrapped interface portion 420 of the imaging assembly 402. The smaller inner diameter of the proximal portion 490 is large enough to accommodate at least the inner member 456 and the communication lines 412, which extend proximally along the inner member 456 to a proximal portion of the intravascular ultrasound imaging device. In some embodiments, the outer member 454 is affixed to the inner member 456, strain relief tubing 470, and/or the imaging device using an adhesive. In other embodiments, the outer member 454 is coupled to the imaging assembly 402 using an interference fit. However, the present application contemplates any suitable means for coupling the outer member to the inner member, strain relief tubing, and/or the imaging assembly 402.

Figure 9:
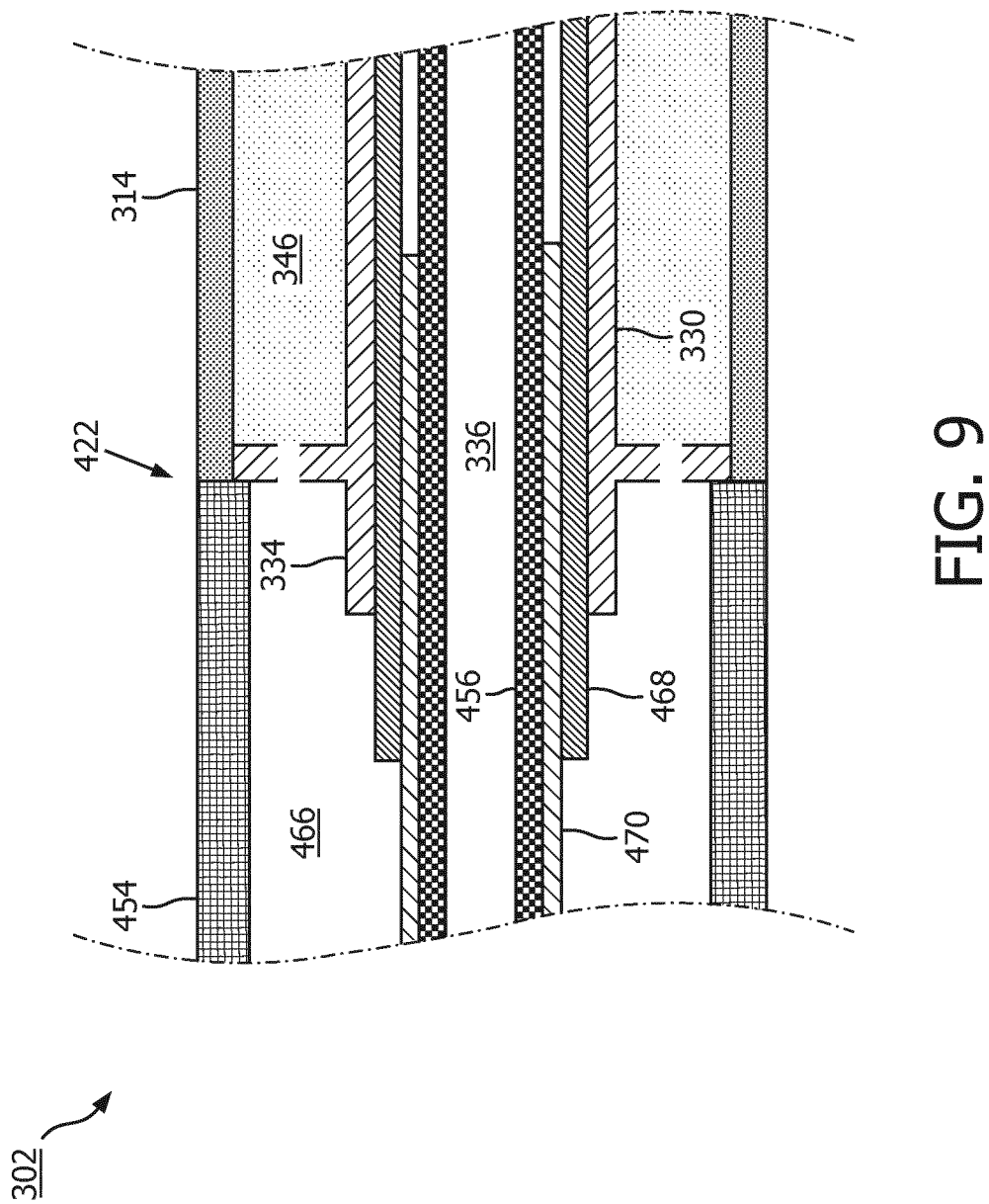
FIG. 9 is a diagrammatic cross-sectional side view of a transition region of a scanner assembly having a flexible distal tip with a proximal extended portion, according to aspects of the present disclosure.

FIG. 9 is a diagrammatic cross-sectional view showing a transition region of an intravascular device 302 that includes a strain relief layer 470 around a proximal inner member 456, according to an embodiment of the present disclosure. In the embodiment of FIG. 9, a proximal extended portion 468 of a flexible distal tip member (e.g., the tip member 252) extends through the lumen 336 of the support member 330, proximal of the proximal flange 334 of the support member 330. The proximal end of the extended portion 468 can extend further proximally in some embodiments. A proximal inner member 456 and an attached strain relief layer 470 are positioned inside a lumen of the proximal extended portion 468, such that the strain relief layer 470 extends at least partially within the lumen 336 of the support member 330.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An intraluminal ultrasound imaging device, comprising:
a flexible elongate member configured to be positioned within a body lumen of a patient, wherein the flexible elongate member comprises an outer member and an inner member positioned inside the outer member; and
an ultrasound imaging assembly comprising:
a flexible substrate comprising a transducer array;
a support member around which the flexible substrate is positioned; and
a backing material,
wherein the support member comprises a lumen, wherein the flexible substrate is positioned around the lumen,
wherein the support member is positioned radially between the strain relief layer and the backing material,
wherein the flexible substrate comprises a conductor interface portion positioned around the strain relief layer;
wherein a stiffness of the support member is greater than a stiffness of the outer member and a stiffness of the inner member,
wherein the ultrasound imaging assembly is coupled to the flexible elongate member at a location along a length of the intraluminal ultrasound imaging device,
wherein the flexible elongate member further comprises a strain relief layer extending across the location where the ultrasound imaging assembly and the flexible elongate member are coupled such that the strain relief layer is configured to prevent kinking of the flexible elongate member at the location,
wherein the outer member, the inner member, the flexible substrate, the support member, the backing material, and the strain relief layer are distinct from one another,
wherein the strain relief layer is positioned radially inward of the flexible substrate and the transducer array,
wherein the strain relief layer is positioned radially between the inner member and the support member.

2. The ultrasound imaging device of claim 1, wherein the strain relief layer comprises a heat shrink material.

3. The ultrasound imaging device of claim 2, wherein the heat shrink material comprises a polyether block amide tube.

4. The ultrasound imaging device of claim 1, wherein the outer member positioned around a proximal portion of the inner member and a proximal portion of the strain relief layer.

5. The ultrasound imaging device of claim 1, wherein the strain relief layer comprises a length of between 5 mm and 15 mm.

6. The ultrasound imaging device of claim 5, wherein the strain relief layer comprises a wall thickness of between 0.025 mm and 0.032 mm.

7. The ultrasound imaging device of claim 1, wherein the strain relief layer is thermally bonded to the inner member.

8. The ultrasound imaging device of claim 1, wherein the strain relief layer is bonded to the inner member using an adhesive.

9. The ultrasound imaging device of claim 1,
wherein the imaging assembly is an intravascular ultrasound (IVUS) assembly, and
wherein the flexible elongate member comprises a catheter.

10. The ultrasound imaging device of claim 1, wherein a proximal end of the strain relief layer is positioned longitudinally distal of a proximal end of the inner member.

11. The ultrasound imaging device of claim 1,
wherein a distal portion of the inner member is positioned within the lumen of the support member,
wherein the strain relief layer is positioned around the inner member such that a proximal portion of the strain relief layer is positioned inside the outer member,
wherein the strain relief layer and the backing material are positioned radially between the inner member and the flexible substrate.

12. A method for assembling an intraluminal ultrasound imaging device, comprising: coupling an ultrasound imaging assembly to a flexible elongate member at a location along a length of the intraluminal ultrasound imaging device,
wherein the ultrasound imaging assembly comprises:
a flexible substrate comprising
a transducer array;
a support member around which the flexible substrate is positioned; and
a backing material,
wherein the support member comprises a lumen, wherein the flexible substrate is positioned around the lumen, wherein the support member is positioned radially between the strain relief layer and the backing material, wherein the flexible substrate comprises a conductor interface portion positioned around the strain relief layer;

wherein a stiffness of the support member is greater than a stiffness of the outer member and a stiffness of the inner member wherein the flexible elongate member comprises an outer member, an inner member positioned inside the outer member, and a strain relief layer extending across the location where the ultrasound imaging assembly and the flexible elongate member are coupled to prevent kinking of the flexible elongate member at the location, wherein the outer member, the inner member, the flexible substrate, the support member, the backing material, and the strain relief layer are distinct from one another, wherein the strain relief layer is positioned radially inward of the flexible substrate and the transducer array, wherein the strain relief layer is positioned radially between the inner member and the support member.

13. The method of claim 12, further comprising:

forming the flexible elongate member comprising:
    positioning the strain relief layer around the inner member; and
    fixedly coupling the strain relief layer to the inner member; and wherein coupling the imaging assembly to the flexible elongate member comprises:

positioning a distal portion of the inner member and a distal portion of the strain relief layer within a lumen of the support member such that the strain relief layer and the backing material are positioned radially between the inner member and the flexible substrate.

14. The method of claim 13, further comprising positioning the outer member around a proximal portion of the inner member and a proximal portion of the strain relief layer.

15. The method of claim 13, wherein fixedly coupling the strain relief layer comprises thermally bonding the strain relief layer and the inner member.

16. The method of claim 15, wherein fixedly coupling the strain relief layer comprises applying heat to the strain relief layer to shrink the strain relief layer around the inner member.

17. The method of claim 16, wherein fixedly coupling the strain relief layer comprises positioning a heat shrink tube around the strain relief layer and applying heat to the heat shrink tube to shrink the heat shrink tube around the strain relief layer.

18. The method of claim 13,
    wherein the support member is positioned radially between the strain relief layer and the backing material.

19. The method of claim 18, further comprising:
    positioning an outer member around a proximal portion of the inner member and a proximal portion of the strain relief layer; and
    positioning a conductor interface portion of the flexible substrate around an outer surface of the strain relief layer,
    wherein positioning the outer member around the proximal portion of the inner member and the proximal portion of the strain relief layer comprises positioning the outer member around the conductor interface portion.

* * * * *